Nov. 5, 1957  J. D. RIESER  2,811,861
ADAPTER COUPLING MEANS
Filed Aug. 3, 1953  2 Sheets-Sheet 2

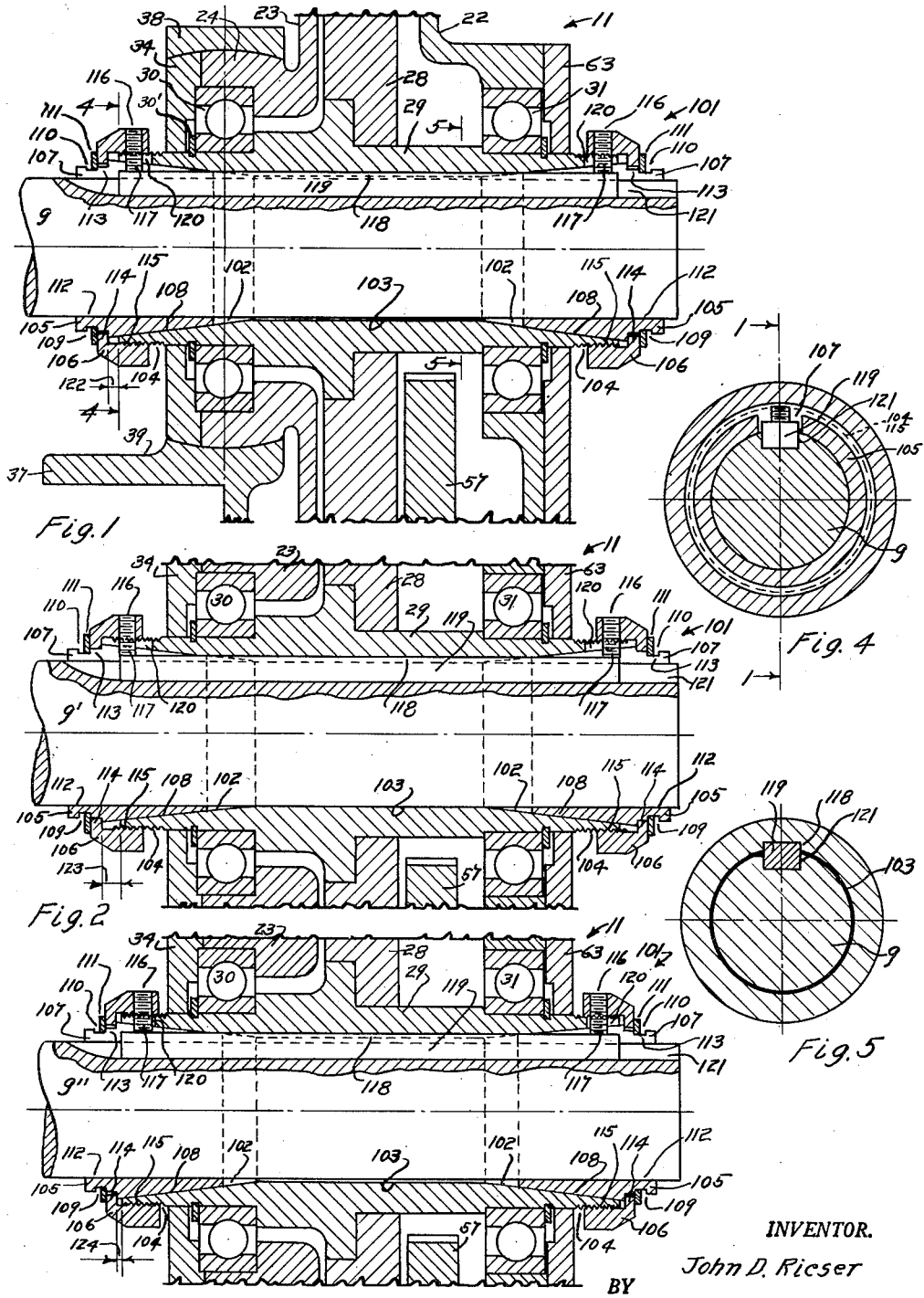

INVENTOR.
John D. Rieser
BY
John D. Rieser

United States Patent Office 2,811,861
Patented Nov. 5, 1957

2,811,861

ADAPTER COUPLING MEANS

John D. Rieser, San Francisco, Calif.

Application August 3, 1953, Serial No. 372,107

9 Claims. (Cl. 74—421)

This invention relates to improvements in a yielding diameter wedge acting power transmission adapter coupling means, particularly those in which the hollowed member such as a hollow power takeoff shaft of inclosed speed change device is attached to a shaft of uniform diameter of a driven mechanism.

An object of the present invention is to provide an improved method for securing of a shaft of a driven mechanism to a hollowed power transmitting shaft whereby screws and internal threads extending parallel to and thereof the walls of said hollowed power-transmitting shaft which are employed conventionally at present for accommodations of the operable connections of the wedge acting adapter coupling units are eliminated.

When applied to a hollowed power takeoff shaft of an inclosed speed change device, the advantages created by this elimination through the invention are:

(1) The external diameter of said hollowed shaft member extending from said speed change device need not be greater than that of the internal diameter of a bearing mounted thereof said hollowed member and said speed change device resulting in:

(2) A very pronounced reduction in the cost of providing said bearing, for the present conventional methods all require a material greater radial distance between the external diameter of the shaft of a driven mechanism and the external diameter of the hollowed member to provide access to and to effect an operable connection for the adapter coupling unit consequently requiring a larger more costly bearing at this point also materially increasing the weight which in turn increases the cost of said hollowed member and its interconnecting parts.

Another object of the present invention is to provide an improved adapter coupling means of the type referred to providing a construction of such character so that the interjoining connection between said hollowed member and the manual operable portion of the adapter coupling means forming the external perimeter of end portions of said hollowed member.

Another object of the present invention is to provide improved adapter coupling means of the type referred to in which a feather key extends in a direction parallel to the axis of the hollowed member and the manual operable portions of said adapter coupling means having locking means to secure an adjustment of the operable portions and end of each of said said locking means to bear upon an end portion of said key and press same into a keyway in the shaft of the driven mechanism.

Other more specific objects and advantages will appear from the following description of the illustrative embodiment of the present invention.

In the drawings accompanying and forming a part hereof, Figure 1, is a side view, partly in section, taken on the line 1—1 of Figure 4, showing the application of a balanced adapter coupling means thereof the hollowed power takeoff shaft member of an inclosed speed change device mounted onto a shaft of the driven mechanism and in this instance said shaft may be considered as being of normal diameter while the straight bore therein the hollowed member may be considered as being oversize.

Figure 2, is a side view similar to that of the Figure 1, but showing the shaft of the driven mechanism as being oversize and comparable to that of the straight bore therein the hollowed member.

Figure 3, is a side view similar to that of the Figure 1, but showing the shaft of the driven mechanism as being undersize.

Figure 4, is a sectional plan view, the section being taken on the line 4—4 Figure 1.

Figure 5, is a sectional plan view, the section being taken on the line 5—5 Figure 1.

Similar numerals refer to similar parts throughout the illustrative views, and where a part is of similar nature, but modified slightly, applying the same numeral with the suffix (') or ('''') added thereafter the numeral, or the prefix (') or ('') added before the numeral.

Figure 6:
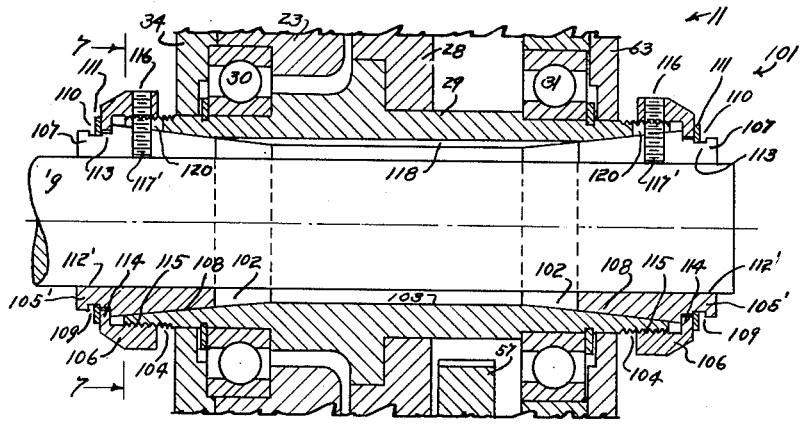
Figure 6, is a side view similar to that of the Figure 1, with exception that the shaft of the driven mechanism is distinctively different in size and of smaller diameter than that of the straight bore in the hollowed member, and to accommodate such situations the adapter coupling means having interchangeability characteristics concerning the split bushing size.
Figure 7:
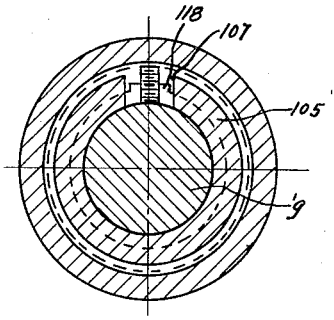
Figure 7, is a sectional plan view, the section being taken on the line 7—7 Figure 6.

In conformity with the objects of this invention, to provide a yielding diameter wedge acting power transmission adapter coupling means, hereinafter referred to as adapter coupling means, also as a shaft adapter unit. The Figures 1–8 show examples of the application of the adapter coupling means, to show method of its forming a couple between the drive shaft 9 of the driven machinery and the power takeoff 29 of the speed change geared speed change unit. In these Figures 1–8 have shown generally the power takeoff portion of my geared speed change device shown and described by my Patent 2,603,983, dated July 22, 1952, which provides for its power takeoff being mounted onto the drive shaft 9 of the driven machinery as at the Figures 1–8. And as the parts 22—24, 28—31, 37—39, 57 and 63 Figures 1–8 are numbered in like manner are generally similar to those shown and described thereof the above specified patent, have here, generally omitted detail description.

And now referring particularly to the Figure 1, the hollow power takeoff shaft 29, also hereinafter referred to as the hollowed member, mounts a power takeoff gear 28 (the fastenings are not shown) and a pair of bearings 30 and 31, which allows for rotation of same and one of these bearings being mounted in manner to prevent of the hollowed member moving in an endwise direction relatively to its mounting and the balance of the speed change device generally indicated by the numeral 11. And in this illustration, both end portions of the hollowed member extend from the ends of the housing of the inclosed speed change device. The Figure 1, shows an application of a balanced adapter coupling means, generally indicated by the numeral 101, which is composed generally of the hollowed member 29, having a pair of opposed tapered bores 102, with a straight bore 103, interconnecting the small end of each of the tapered bores 102, and including external screw threads 104, spaced from in a radial direction and about a portion of both the tapered bores 102. The external diameter of the screw threads 104 being of relative size so as to permit of the internal diameter of the inner race of the bearings 30 or 31 being mounted onto the shaft 29 as illustrated. The hollowed member is also provided with a keyway 118, which extends in axial direction the length of the straight bore 103 and into the tapered bores 102, for the feather key 119. And at each end portion of the hollowed member being provided with a slotted or notched hole 120, in line with the keyway for a combined locking and seating means, hereinafter described, and then the balanced adapter coupling means includes a pair of split bushings 105, each of which is provided with an actuating nut 106.

Then each of the split bushings 105 are longitudinally split as at 107 and they each have an external tapered portion 108 to engage into each of the tapered bores 102 in the hollow member 29. Also each of these split bushings 105 have a recessed hub 109 extending axially from the larger or outer end of the taper portion 108 so that the recessed portions of these hubs 109 provide a first shoulder as at 113 at the larger end of the external taper portion 108 for an internal circumferential tongue 114 of the actuating nut 106 hereinafter described and a second shoulder as at 110 spaced from the first shoulder for the snap ring 111, with a bore 112 extending through the tapered portion 108 and the recessed hub 109 for the drive shaft 9 of the driven machinery.

Each of the actuating nuts 106 are provided with internal screw threads 115 extending inwardly from one end for threading engagement with the external screw threads 104 on each end portion of the hollowed member 29, and at the opposite end each actuating nut has an internal circumferential tongue 114, that has an internal diameter that is less than the external diameter of the larger end of the external tapered portion 108 of the split bushings 105 and provide an internal radial face for abutting against the shoulder at the larger diameter of the tapered portion 108, so as to permit of effecting movement in desired axial direction of the unit composed of the split bushing and the actuating nut, as is hereinafter described. The relative size between the external diameter of the recessed portion of the recessed hub 109 and the bore in the tongue 114 permitting of rotation between these two elements. The external portions of the nut 106, may be of any desired form, in this instance have shown a circular form, and extending in a radial direction through wall of each nut member 106 are a series of tapped holes 116 (only one is here shown at each nut) and into same are screwed the setscrews 117, which extend through the slotted holes 120 and the longitudinal splits 107, and end of these screws 117 bear upon the end portions of the key 119 and effects seating of same in radial direction therein the keyway 121 provided in the shaft 9 of the driven mechanism. Thus it is readily seen that these setscrews 117, form a combined seating and locking means of an adjustment hereinafter described.

In preparing for coupling, the small end of each of the split coupling 105 of the units which includes the actuating nut members 106, are inserted into the tapered bores 102 in the hollowed member 29, and the nut member of each unit being turned in the proper direction for loosely engaging their internal screw threads 115 therewith the external screw threads 104 about a portion of the tapered bores, this may be accomplished before or after insertion of shaft 9 and the key 119, for the lateral width of the longitudinal splits 107 when in free position are of greater width than that of the key 119, as is hereinafter described. And with the shaft 9 in place, the nut members 106 are turned in the same direction with the result that through the engagement of the first shoulder at the larger end of the tapered portion 108 of the split bushing members 105 with a correspondingly internal radial face of each tongue 114 of the nut members 106, moves in axial direction toward the center of the speed change device, see Figure 1, each of said units relatively to the hollowed member 29 and the shaft 9, and wedging tapered portion of the split bushing members between the tapered bores 102 and the external diameter of the drive shaft 9 to bind the two in fixed concentric relationship. A wrench in the form of a pin having proper end may be inserted into any of the series of holes 116 extending in a radial direction through wall of each nut member 106, to effect tightening of said units, also it will be noted that the axial length of the recessed portion of the recessed hub 109 is greater than that of the lateral width of the snap ring 111, which permits if desired, of tapping the hub end and effect axial movement of the bushing member independently of the nut member of each said units, and this latter axial movement, then being taken up by further turning of the nut member. The tapped holes 116 being spaced about the nut members permits of fine adjustments and providing for one of the series of holes in each case registering with the slotted hole 120 and key 119, and upon screwing into said tapped hole a setscrew 117 and the end of said setscrew bearing upon said key, locks said fine adjustment and properly seats said key in radial direction into the keyway 121 in said shaft in practical manner, so as to permit of the straight bore 103 in the driving or hollowed member 29 being of other diameter than that of the diameter of the shaft being coupled, with advantages of accommodating situations hereinbefore and hereinafter described. Then on the other hand it is obvious that in rotating the actuating nut in reverse direction, automatically produces an actuating force therebetween the outer radial face of the tongue and the second shoulder, which causes withdrawal of the tapered portion 108 therefrom the tapered bores 102, the snap ring being disposed externally between the tongue and the second shoulder, and it will be noted that the snap ring 111, bears no relationship when effecting the above mentioned binding connection between the hollowed member and an external portion of the drive shaft.

In mechanics it is well recognized and a desirable feature that a fit between a shaft of the driven mechanism and that of the hollowed member mounted directly thereof to transmit power from one to the other, need be provided with a fit of tight character. And this desirable feature in practice is not always conveniently feasible, particularly so when the shaft upon which is to be directly coupled the hollow member of a manufactured power transmission device, are of ordinary commercial shafting.

It is well known the variation of the external diameter of commercial shafting varies considerable from that of its particular designated size. In some classes of commercial shafting, the steel manufacturers permissible variations, range from above to below its normal designated size, while other classes of commercial shafting, the permissible variations range from its designated size and below. And to accommodate such situations, a prevailing practice being the employment of conventional types of tapered split contractible sleeve or like type coupling apparatus, all of which employ cumbersome attachment means, such as flanges with screws or like extending therefrom and abutting onto or screwed into the hollowed member, or attachment means having external threads engaging the hollowed member, all of which and more are advantageously eliminated by the present development.

Again referring to the Figure 1, the diameter of the straight bore 103 interconnecting the small end of each of the tapered bores 102 therein the hollowed member 29, is shown as being larger than that of the external diameter of the shaft 9, and the bore 112 therein each of the bushing members 105 when in free position may be bored in a like manner to permit of said shaft being slipped therethrough the balanced adapter coupling means 101 as a whole, and in this illustration, the diameter of said shaft being considered of a size equivalent to that of its designated size, with a result that after the final adjustment therein the tapered bores 102 of tapered portion of the split bushing members, the large end of same projects from the ends of the hollowed member the distance represented by 122. And referring to the Figure 4, the lateral width of the longitudinal split 107 being greater than that of the lateral width of the key 119 together with the material and the structural section of the split bushing members provides that its diameters yield to conform with the external diameter of the shaft upon its being forced in the tapered bores. And referring to the Figure 5, there being a difference between the two said diameters, produces a gap situation at the key, which under conventional methods would present an undesirable and impractical power transmitting situation, of which is entirely overcome in practical manner by the present development, for the combined locking and seating means hereinbefore described, along with tapered portion of said bushing members maintaining concentricity between said hollowed member and said shaft, the setscrews pressing upon said key provides for the maintenance of said key in a radial direction in the keyway 121 in said shaft and maintaining of the driving qualities of said key between the connected parts irrespective of said gap.

And referring to the Figure 2, in this instance, the diameter of the straight bore 103 and the external diameter of the shaft 9' are shown as being alike, and in this illustration, the diameter of said shaft being considered larger than its designated size, with a result that after the final adjustment therein the tapered bores 102 of the taper portion of the split bushing members, the large end of same projects from the ends of the hollowed member the distance represented by 123, which is greater than that of the distance represented by 122 thereof Figure 1.

And now referring to the Figure 3, in this illustration, the external diameter of the shaft 9'' is shown as being smaller than that of the shaft 9 thereof the Figure 1, consequently after the final adjustment therein the tapered bores 102 of tapered portion of the split bushing members, the large end of same projects from the ends of the hollowed member the distance represented by 124 at Figure 3, which is less than that of the distance represented by 122 thereof Figure 1.

Thus it is readily seen that the adapter coupling means 101 provides for a fit of tight character between a hollowed member of a manufactured power transmission device, that is to be mounted directly thereof a designated size shaft of the driven mechanism irrespective of the permissible variations conventionally encountered in practice of said designated size.

The Figure 6 shows a situation where the drive shaft 9' of the driven mechanism is of entirely different designated size to that shown thereof the Figures 1–5. And to accommodate such situations, the present development provides convenient method for interchangeability of the split bushing members thereof a given structure, for by the removal of the snap ring members, split bushing members having the desired bore may be readily applied without upsetting other portion of the adapter coupling means. And the split bushing members 105', thereof the Figure 6, are of the same general construction as those hereinbefore described, the only difference being that the bore 112', is of smaller size and the length of the tapered portions are shorter to accommodate the smaller diameter shaft 9' of the driven mechanism. The illustration also omits the drive key connection between the connected parts, altho should power transmitting conditions warrant a drive key, same can readily be included without altering the structure.

Figure 8:
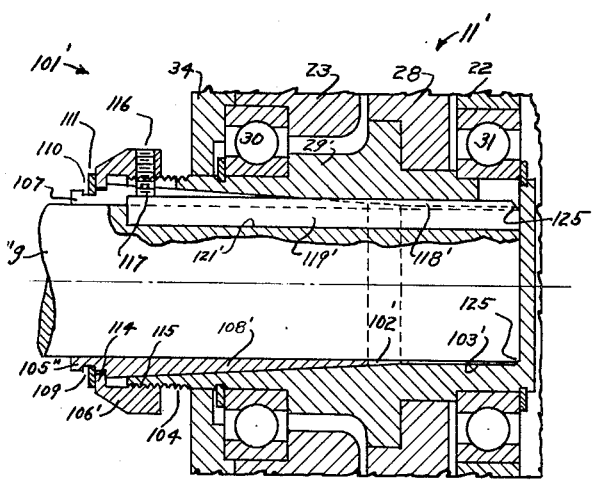
Figure 8, is a side view, partly in section, showing the application of my adapter coupling means thereof the hollowed power takeoff shaft member of an inclosed speed change device mounted onto a shaft of the driven mechanism, and in this instance the hollowed member does not extend through both ends of the speed change device.

The structure shown thereof the Figure 8, shows an application of the present development thereof a speed change device of the same general character as that heretofore mentioned, in this illustration the hollowed member 29' does not extend through both ends of the geared speed change unit, generally indicated by the numeral 11', all of which does not impair the application of the present development, for referring to the Figure 8, the end portion of the hollowed member 29' shown projecting from the lefthand end of the speed change device, has a tapered portion 102', that terminates thereof the straight bore 103', portion of the hollow within this hollowed member, and same includes a keyway 118', which extends the length of said straight bore portion and reaches within a portion of the tapered bore 102'. The unit composed of the actuating nut member 106' and the split bushing member 105'', is of similar construction and serves the same purposes as that heretofore described, including the maintenance of the concentric relationship between the shaft 9'' and the hollowed member 29' by the split bushing member 105'', however same may be supplemented by utilizing the chamfers 125, shown at the blind end of said straight bore, by providing the end of said shaft that is shown abutting against the blind end of said straight bore with similar chamfers, that in turn engage with said first mentioned chamfers. And it is readily seen that, the combined locking and seating means is similar to that heretofore described.

Various changes may be made in the embodiment of the invention hereinabove specifically described without departing from or sacrificing the advantages of the invention as defined in the appended claims.

I claim:

1. A shaft adaptor unit comprising, a driven shaft, a hollow power takeoff shaft member having a tapered axial bore and external screw threads extending from an end of said member, journal means for said member within an enclosing housing having apertured means through which said member extends, a single piece tapered longitudinally split bushing, said bushing having an external tapered portion to engage within said tapered bore and a recessed hub projecting axially beyond the larger end of said tapered portion having a first shouldered portion, said recessed hub extending beyond said first shouldered portion to an enlarged portion the diameter of which forms a second internal shouldered portion, said bushing being bored for placement of said driven shaft therethrough, a nut, said nut threadingly engaging said external screw threaded portion and having spaced axially therefrom a tongue, said tongue extending toward said recessed hub between said first and second shouldered portions to permit relative movement between said nut and said bushing, said first and second shouldered portions forming means limiting axial movement between the nut and said bushing, so that manually effecting relative rotation in a selected direction between said nut and said member causes axial movement by said nut and said bushing to cause wedging of said tapered portion between said tapered bore and said driven shaft, said external screw threads being of such a nature so that their diameter is unaffected during this wedging action, the external diameter of said nut being further independent of the diameter of said apertured means.

2. A balanced shaft adaptor unit comprising, a driven shaft, a hollow power takeoff shaft member having on each end an external screw threaded portion, a keyway in said driven shaft, a pair of opposed tapered bores and a straight bore in said member, said straight bore being sized to permit the driven shaft to extend therethrough and connecting the small end of each said tapered bore and forming together with the keyway a hollow within said member, a key in said hollow extending the axial length of said member, journal means for said member within an enclosing housing which has apertured means through which said member extends, a pair of longitudinally split bushings each of which is bored for placement of the driven shaft therethrough, said bushings also having an external tapered portion for engaging said tapered bores and a recessed hub projecting beyond the larger end of said tapered portion having a first integral shouldered portion, said recessed hub extending beyond said first shouldered portion to an enlarged portion, the diameter of said enlarged portion being greater than the adjacent hub portion and forming a second integral shouldered portion, the lateral width of the longitudinal split of said bushings permitting said key to pass therethrough, a nut for each of said bushings, each nut threadedly said external screw threads and having axially spaced therefrom a tongue, said tongue extending toward said recessed hub between said first and second shouldered portions and permitting relative movement between each said nut and its respective bushing, said first and second shouldered portions forming means of limiting axial movement between the nut and its bushing, so that manually effecting relative rotation in a selected direction between said nut and said member causes axial movement of said nut and its bushing and causes wedging of said tapered portion between the tapered bore and said driven shaft, said external screw threads being such that upon the wedging action no thread diameter deformation takes place, each of said nuts also including a set screw threadedly connected thereto, and extending in a radial direction through a wall of said member and said split, and in which an end of each setscrew bears upon relative end portions of said key and so anchors it into said keyway and simultaneously prevents further screw threading action between said nut and said member.

3. A shaft adaptor unit comprising in combination, a driven shaft, a hollow power takeoff shaft member, a single piece longitudinally split bushing, and a nut, said member having an external screw threaded portion extending from an end thereof and having a tapered bore, said bushing having an external tapered portion for engaging the tapered bore on said member and a recessed hub projecting beyond the large end of said tapered portion, the diameter of said hub being of a lesser diameter than said large end and so forming a first integral shouldered portion, said recessed hub extending beyond said first shouldered portion to an enlarged portion the diameter of which is greater than the adjacent hub and so forms a second integral shouldered portion, a snap ring adjacent to said second shouldered portion, said bushing being bored for placement of said driven shaft therethrough, said nut threadingly engaging said external screw threads and having axially spaced therefrom a tongue, said tongue extending toward said recessed hub between said first shouldered portion and said snap ring so as to permit relative movement between said nut and said bushing while said shouldered portions form means limiting axial movement between the nut and its bushing, so that manually effecting relative rotation in a selected direction between said nut and said member causes axial movement of the nut and its bushing and effects wedging of said tapered portion between said tapered bore and said driven shaft, said external screw thread being of such a nature that it is unaffected by diametral deformation under said wedging action, and in which said nut and said bushing is applied to said member as a unit to facilitate installation, the inner diameter of said tongue and the diameter of said first shouldered portion being less than the diameter of said end.

4. A shaft adaptor unit comprising, in combination, a driven shaft, a hollow power takeoff shaft member, said member having external screw threads and having internally a tapered bore extending from an end of said member, a nut, said nut having internal screw threads corresponding to and engaging said external screw threads and having spaced axially therefrom a circumferential tongue, a one piece tapered longitudinally split bushing having an external tapered portion engaging with said tapered bore and having a recessed hub extending axially beyond the larger end of said tapered portion, a bore extending through said split bushing for engagement therein of said driven shaft, the external diameter of the recessed hub adjacent to said larger end forming a radial shoulder for said tongue, said tongue extending around said recessed hub with its internal radial surface operably engaging said shoulder, so that upon manually effecting relative rotation in selected direction between said nut and said member said bushing together with said nut move axially and cause wedging of said bushing tapered portion between said tapered bore and the external diameter of said driven shaft extending through said bore, and the external diameter of said shoulder being less than the diameter of said external screw threads, and said shouldered portion together with said recessed hub being an integral part of said bushing.

5. A shaft adaptor unit comprising, in combination, a driven shaft, a hollow power takeoff shaft member, a journal supporting said member, a single piece longitudinally split bushing, and a nut, said member having external screw threaded portion extending from an end of said member and spaced axially therefrom and having means mounting an inner race of said journal support, and in which said external screw threaded portion is of a diameter to permit of said inner race to pass thereover, said member including a tapered bore extending therein from said end, said bushing having externally a tapered portion for engaging said tapered bore and a recessed hub projecting beyond the large end of said tapered portion forming a shouldered portion, and internally being bored for placement therein said driven shaft, said nut having means threadingly engaging said external screw threads and having spaced axially therefrom a tongue, said tongue extending toward said recessed hub so as to permit its inner radial surface to operably engage said shouldered portion, so that manually effecting relative rotation in selected direction between said nut and said member causes movement axially between said tapered portion and said tapered bore and wedges said split bushing between said tapered bore and said driven shaft, and in which the diameter of said external screw threaded portion remains unimpaired by said wedging.

6. In combination, a single piece longitudinally split bushing, having an external tapered portion and a recessed hub projecting beyond the large end of said tapered portion, the external diameter of said hub being adjacent to said end and being of smaller diameter so that it forms a shoulder means, a nut having axially spaced therefrom an internal circumferential tongue, said tongue extending toward said hub with its inner radial surface engaging said shouldered means and so providing operable engagement with said shouldered means, a shaft member, said member having a tapered bore corresponding to said tapered portion and having spaced radially therefrom external screw threads that corresponds to said internal screw threads of said nut, so that manually effecting relative rotation in selected direction between said nut and said member causes movement axially between said tapered portion and said tapered bore, and the external diameter of said shouldered means being less than the diameter of the external screw threads, and in which said shouldered means together with said hub are an integral part of said bushing.

7. In combination, a longitudinally split bushing, having an external tapered portion and a recessed hub projecting beyond the large end of said tapered portion forming a shouldered portion, a nut having axially spaced therefrom a tongue, said tongue extending toward said recessed hub so as to permit its inner radial surface to engage said shouldered portion, a shaft member, said member having external screw threads and having spaced axially therefrom mounting bearing means for supporting said member, the external perimeter of said external screw threads being sized so as to permit of the internal perimeter of said bearing means passing thereover, said member having a corresponding tapered bore for engagement with said tapered portion and said nut threadingly engaging said external screw threads, said external screw threads being spaced radially from said tapered bore and extending in a longitudinal direction from its larger end toward the smaller end, and the diameter of said shouldered portion being less than the diameter of said screw threads.

8. A balanced shaft adaptor unit comprising, a driven shaft, a hollow power takeoff shaft member, having on each end an external screw threaded portion, a keyway in said driven shaft, a pair of opposed tapered bores and a straight bore in said member, said straight bore being of such a size to permit said driven shaft to extend therethrough and connecting the small end of each said tapered bores and forming together with a mating keyway a hollow within said member, a key in said keyway and said mating keyway and extending the axial length of said member, a pair of longitudinally split bushings, each said bushing being of single piece and bored for placement of said driven shaft therethrough, and in which each said bushing has externally a tapered portion for engaging said tapered bores and a recessed hub projecting beyond the larger end of said tapered portion said hub forming a first integral shoulder, said recessed hub extending beyond said first shoulder to an enlarged portion, the diameter of said enlarged portion being greater than the adjacent hub portion and forming a second integral shoulder, the lateral width of the single longitudinal split of said bushings permitting said key to pass therethrough, a nut for each of said bushings, each said nut threadingly engaging said external screw threads and having spaced axially therefrom a circumferential tongue, said tongue extending toward said recessed hub intermediate said first and second shoulders so as to permit rotative movement between each nut and its bushing, while said first and second shoulders form means limiting axial movement between the nut and its respective bushing, so that manually effecting relative rotation in selected direction between said nut and said member causes movement axially by said nut and said bushing and causes wedging of said tapered portion between the tapered bore and said driven shaft, the external diameter of said shoulders being less than the diameter of said external screw threads, and said shoulders together with said recessed hub being an integral part of said bushing in each instance, and each said nut including a setscrew threadingly connected thereto and extending in radial direction through a wall of said member and the longitudinal split of said bushing, and in which an end of each setscrew bears upon an end portion of said key and so anchor it into said keyway and simultaneously prevent further screwing action between the nut and said member.

9. A shaft adaptor unit comprising, in combination, a driven shaft, a hollow power takeoff shaft member, said member having external screw threads and having internally a tapered bore extending from an end of said member, a nut, said nut having internal screw threads corresponding to said external screw threads and having spaced axially therefrom a circumferential tongue, a single piece split bushing, said bushing having an external tapered portion to engage within said tapered bore and a recessed hub extending axially beyond the larger end of said tapered portion, a bore extending through said bushing for engagement therein of said driven shaft, the external diameter of the recessed hub adjacent to said larger end being of lesser size so that the difference between said larger end and said diameter forms a first radial shoulder for said internal circumferential tongue, said nut having its internal screw threads threadingly engaging said external screw threads, said tongue extending around said recessed hub with its internal radial surface operably engaging said first radial shoulder so that manually effecting relative rotation in selected direction between said nut and said member forces said bushing together with said nut to move axially and so cause wedging of said bushing tapered portion between said tapered bore and the external diameter of said driven shaft, and said recessed hub extending axially beyond said first radial shoulder to an enlarged portion, the diameter of said enlarged portion being greater than the adjacent hub portion and so forming a second radial shoulder for the outer radial surface of said tongue so that upon manually unscrewing of said nut from said member said bushing together with said nut move axially and release said wedging, the external diameter of said radial shoulders being less than the diameter of said external screw threads, and said first and second radial shoulders together with said recessed hub being an integral part of said bushing.

References Cited in the file of this patent

UNITED STATES PATENTS

| | | |
|---|---|---|
| 258,797 | Newell | May 30, 1882 |
| 726,336 | Ott | Apr. 28, 1903 |
| 2,377,046 | Siegerist | May 29, 1945 |
| 2,447,299 | Williams | Aug. 17, 1948 |
| 2,475,042 | McCloskey | July 5, 1949 |
| 2,556,151 | Bremer | June 5, 1951 |
| 2,603,983 | Rieser | July 22, 1952 |
| 2,612,788 | Christian | Oct. 7, 1952 |
| 2,699,589 | Redell | Jan. 18, 1955 |